United States Patent Office 3,350,236
Patented Oct. 31, 1967

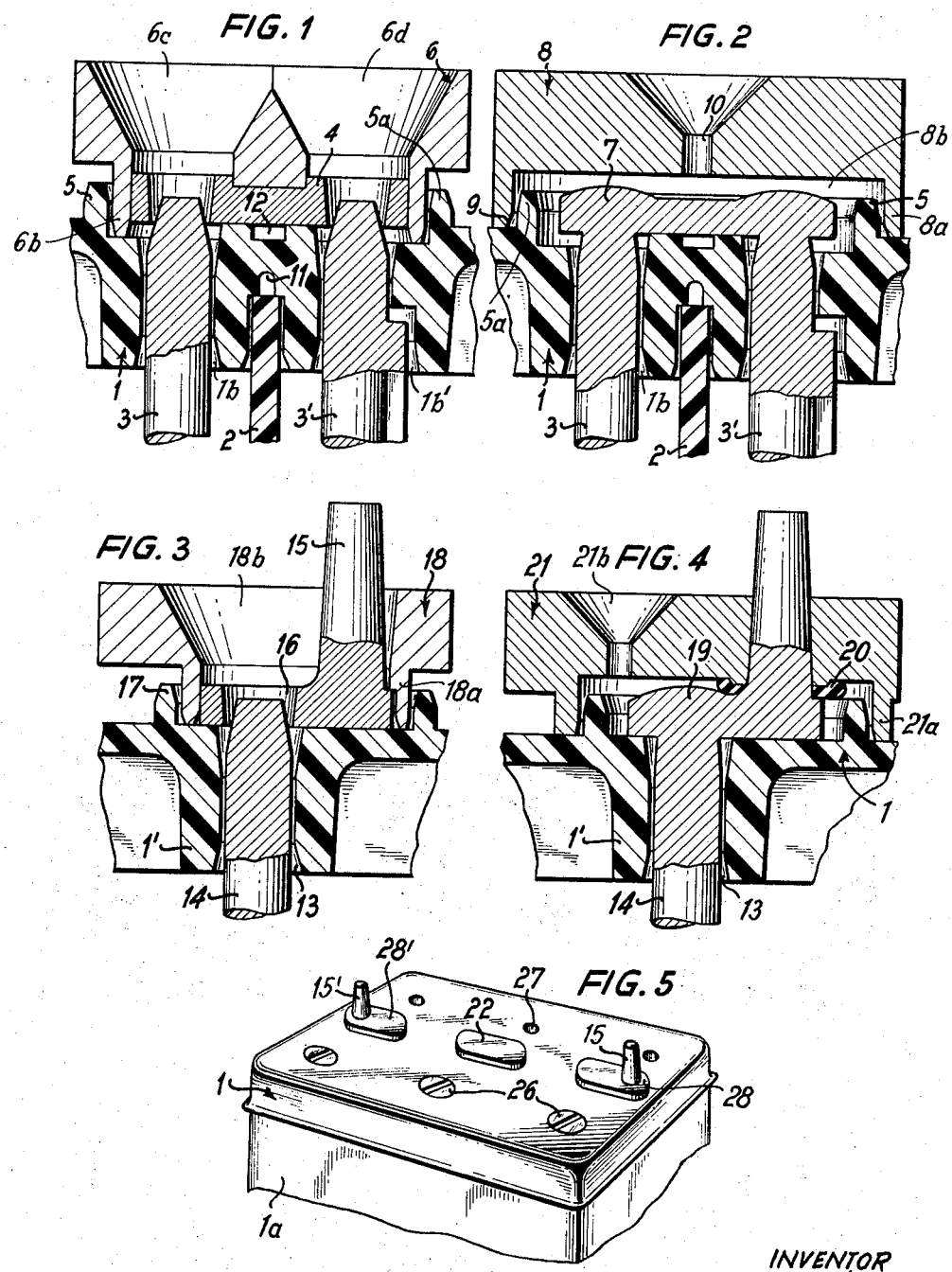

3,350,236
METHOD OF PRODUCING STORAGE BATTERIES
Gert Niemann, Hildesheim, Germany, assignor to Robert Bosch G.m.b.H., Stuttgart, Germany
Filed Mar. 19, 1965, Ser. No. 441,213
Claims priority, application Germany, Apr. 3, 1964, B 76,174
16 Claims. (Cl. 136—176)

The present invention relates to multi-cell storage batteries for automotive vehicles and the like. More particularly, the invention relates to an improved method of fastening the terminal posts, of providing electric connections between the terminals of adjoining cells, and of sealing the cover in a multi-cell storage battery.

Heretofore known methods of carrying out the above operations must be practiced by resorting to bulky, expensive and complicated machines. Much time is lost for properly positioning various molds which are utilized to pour metallic and insulating materials such as will respectively provide electrical connections for current-conducting parts and will insulate the cover in a multi-cell storage battery. Moreover, the cover of a storage battery which is produced in accordance with heretofore known methods requires costly and time-consuming aftertreatment, not only as regards the insulation around both terminal posts and one or more cell connectors but also as regards the exact configuration of terminal posts.

Accordingly, it is an important object of the present invention to provide a novel method of connecting the terminals of a multi-cell storage battery with the cell connector and of providing an insulation around the resulting current-conducting bridge.

Another object of the invention is to provide a novel method of connecting the terminal posts with post straps of end cells in a multi-cell storage battery and of providing an insulation around the connection between such current-conducting parts.

A further object of the invention is to provide a novel prefabricated cover for multi-cell storage batteries which may be utilized with advantage in carrying out the above-outlined methods and which may be integrally connected with one or more partitions between adjoining cells in an operation which is carried out simultaneously with insulation of the bridge that connects the terminals of adjoining cells.

An additional object of the invention is to provide improved molds which may be used in practicing the above outlined method and which are particularly suited for use in connection with the improved cover to insure the formation of electric connections and insulating caps which require no aftertreatment.

A concomitant object of the invention is to provide a method of simultaneously treating the covers of two or more storage batteries.

Another object of the invention is to provide a method according to which the cover of a storage battery may be finished in a small number of steps and according to which the cover requires no further treatment as soon as the cell connector or connectors and both terminal posts are properly surrounded by caps of insulating material.

Briefly stated, one feature of my present invention resides in the provision of a method of anchoring and insulating the cell connector in a multi-cell storage battery whose cover consists of weldable thermoplastic material and is provided with openings for the terminals of adjoining cells. The method comprises the steps of forming the upper side of the cover with two locating surfaces one of which surrounds the other thereof and the other of which surrounds the terminals with at least some clearance, placing an apertured cell connector onto the upper side of the cover so that the apertures of the cell connector receive the terminals and that the cell connector is located within the confines of the other locating surface, placing a first mold against the other locating surface and pouring into the mold a molten metal at such temperature that the metal is fused with the cell conector and with the terminals, removing the mold when the resulting one-piece bridge hardens and placing a second mold against the one locating surface, introducing into the second mold a molten thermoplastic material at such temperature and in such quantities that the material is fused with the cover and forms an insulating cap around the metallic bridge, and removing the second mold when the cap hardens.

In accordance with another feature of my invention, the above outlined method can be carried out simultaneously with a second method which is utilized to form an insulating cap around the terminal post of an end cell in a multi-cell storage battery. The cover is provided with an opening for a post strap and its upper side is formed with two additional locating surfaces, one of which surrounds the other thereof and the other of which surrounds with at least some clearance the opening for the post strap. In the first step, a prefabricated terminal post having a suitably configurated eye is placed onto the upper side of the cover so that its eye receives a portion of the post strap. In the next step, a third mold is placed against the other additional locating surface so that it surrounds the eye of the terminal post, and a molten metal is poured into the third mold at such temperature that the metal is fused with the terminal post and with the post strap to form therewith a second one-piece bridge. When the second bridge hardens, the third mold is removed and is replaced by a fourth mold which is properly located by the one additional locating surface. By pouring a molten thermoplastic material into the fourth mold at such temperature that the molten material is fused with the material of the cover, one obtains a second cap which conceals the major part of the second bridge so that only the terminal post projects upwardly and beyond the second cap.

The two methods may be carried out simultaneously, and the second method may be carried out in connection with both terminal posts of a multi-cell battery. If the battery comprises three or more cells, two or more cell connectors will be applied, welded and insulated in a simultaneous operation. Furthermore, two or more battery covers may be treated simultaneously whereby the molds may be applied and removed by resorting to suitable automatic machinery whose construction forms no part of the present invention.

In accordance with a preferred embodiment of my method, the locating surfaces on the thermoplastic cover constitute the internal and external surfaces of suitably configurated (preferably non-circular) annular projections or ribs which extend beyond the upper or outer side of the cover. The internal surface of a rib which surrounds the terminals of two adjoining cells will locate the first mold and the external surface of the same rib will locate the second mold. A second rib is provided on the cover around the opening for the post strap of each end cell, and the internal and external surfaces of such ribs will locate the third and fourth molds.

The novel features which are characteristic of the invention are set forth in particular in the appended claims. The improved cover itself, however, both as to its construction and the method of sealing the same, together with additional features and advantages thereof, will be best understood upon perusal of the following detailed description of certain specific embodiments with reference to the accompanying drawings, in which:

FIG. 1 is an enlarged fragmentary section through the cover of a multi-cell storage battery and illustrates the manner in which a cell connector may be fused with the terminals of two adjoining cells by resorting to a first mold;

FIG. 2 is a similar section and illustrates the completed bridge which connects the terminals as well as a second mold which is utilized for pouring molten thermoplastic material to form an insulating cap around the bridge;

FIG. 3 is an enlarged fragmentary section through another portion of the cover and illustrates a terminal post together with a third mold which is used to admit liquid metal serving to fuse the terminal post with the post strap of an end cell;

FIG. 4 is a similar section through the cover and illustrates a fourth mold which is used to admit molten thermoplastic material serving to form an insulating cap around the connection between the terminal post and post strap shown in FIG. 3; and FIG. 5 is a smaller scale fragmentary perspective view of a storage battery which is constructed and assembled in accordance with my method.

Referring first to FIG. 5, my present invention is concerned with a method of finishing the cover 1 of a multicell storage battery having a plastic container 1a, two terminal posts 15, 15′, vent holes 27, a cell connector cap 22, two terminal post caps 28, 28′, and recessed plugs 26 which seal a series of refill openings.

Prior to being treated in accordance with my invention, the cover 1 is configurated as shown in FIG. 1. Its platelike main body portion is placed onto the upper edges of the container 1a (not shown in FIG. 1) and its underside is provided with an elongated groove 11 to receive the upper edge portion of a vertical wall 2 constituting the partition between two adjoining cells. Two openings 1b, 1b′ are provided in the cover 1 at the opposite sides of the partition 2 to accommodate the terminals 3, 3′ of the adjoining cells. In the first step, a prefabricated apertured metallic cell connector 4 is placed onto the upper or outer side of the cover 1 so that the apertures of its eyes receive the upper ends of the terminals 3, 3′. The median portion of the cell connector 4 rests on the cover 1 at a level above the upper edge portion of the partition 2.

The main body portion of the cover 1 is formed with an upwardly extending integral annular projection or rib 5 of oval outline which surrounds with some clearance the cell connector 4 and whose internal surface serves to locate a first metallic mold 6 having a downwardly extending annular portion or neck 6a received between the periphery of the cell connector 4 and the internal surface of the rib 5. The lower edge portion 6b of the neck 6a tapers toward the upper side of the cover 1, and the upper edge portion 5a of the rib 5 tapers in the opposite direction. This facilitates insertion of the neck 6a into the space within the rib 5. In the position shown in FIG. 1, the lower end face of the neck 6a is in sealing abutment with the outer side of the cover 1 and the outer side of the neck 6a is in sealing abutment with the internal surface of the rib 5 so that the mold is ready to receive a charge of molten lead whose temperature is sufficiently above the melting point to insure that the material of the cell connector 4 is fused with the material of the terminals 3, 3′ whereby the terminals and the cell connector form a one-piece metallic bridge 7 shown in FIG. 2. The mold 6 has two separate inlets 6c, 6d through which molten lead flows to fill the apertures in the eyes of the cell connector 4 or to rise to a level slightly above the top face of the cell connector.

In the next step, the mold 6 is removed as soon as the material of the bridge 7 hardens and is replaced by a second metallic mold 8 having a neck 8a which is properly located by the external surface of the rib 5 and includes a tapering lower edge portion 9 which is in sealing abutment with the upper side of the cover 1. The mold 8 has a centrally located inlet 10 for admission of liquid thermoplastic material which fills the space between the rib 15 and the bridge 7 as well as the space 8b between the upper side of the bridge and the underside of the mold 8. Such molten material is introduced at a temperature which is high enough to insure that the resulting smooth-surfaced insulating cap 22 (see FIG. 5) is fused with the material of the rib 5 and with the material along the upper side of the cover 1 within the confines of the rib 5. The mold 8 is removed after the cap 22 hardens and this cap thereupon requires no further treatment. In fact, the cap 22 forms an integral part of the cover 1 and fully conceals not only the bridge 7 but also the rib 5. The uppermost portion of the groove 11 above the top face of the partition 2 also receives liquid thermoplastic material which is admitted through the inlet 10 and is fused with parts 1, 2 to provide an integral connection therebetween. The duct connecting the space 8b within the mold 8 with the groove 11 is not shown in the drawings. Alternatively, the groove 11 may be filled with insulating material prior to formation of the bridge 7.

The upper side of the cover 1 is further provided with a groove 12 which is located beneath the central portion of the cell connector 4 and may receive a sealing element, not shown. The sealing element is compressed by the cell connector 4 and thereupon remains in compressed condition as soon as the connector is fused with the terminals 3, 3′ to form the bridge 7. The groove 12 allows for more accurate face-to-face abutment between the cell connector 4 and cover 1. The non-illustrated sealing element in the groove 12 prevents leakage of electrolyte for extended periods of time.

FIG. 3 illustrates another portion of the cover 1 having an opening 13 for a post strap 14 whose upper portion extends into the funnel-shaped aperture defined by the eye 16 of a prefabricated terminal post 15. The eye 16 of the post 15 rests on the upper side of the cover 1 and is located within the confines of a second projection or rib 17 which is integral with the cover 1. The rib 17 is of substantially oval outline and its internal surface is spaced from the periphery of the eye 16 so that the space between the parts 16, 17 may receive the neck 18a of a third metallic mold 18 which is provided with an inlet 18b for admission of molten lead. The temperature of molten lead is high enough to insure that such molten lead fuses with the material of the strap 14 and eye 16 and that the resulting metallic body forms a one-piece bridge 19 shown in FIG. 4. Once the material of the bridge 79 hardens, the mold 18 is removed and the operator places a rubber gasket 20 around the lower part of the post 15. In the next step, the operator places a fourth metallic mold 21 onto the upper side of the cover 1 so that the neck 21a of the mold surrounds the external surface of the rib 17. The mold 21 has an inlet 21b for admission of liquid thermoplastic material which is fused with the cover 1 to form an insulating cap 28 shown in FIG. 5. The mold 21 also compresses the gasket 20 to prevent leakage of plastic material along the periphery of the post 15. The cap 28 retains the gasket on the post 15 after the mold 21 is removed. The edge portions of the rib 17 and necks 18a, 21a are tapered in the same way as described in connection with the rib 5 and edge portions 6a, 8a.

The other terminal post 15′ (see FIG. 5) may be fused with the corresponding post strap in an operation which follows the operation described in connection with FIGS. 3 and 4 or simultaneously therewith. Also, the formation of the bridge 7 and bridges 19, 19′ may be carried out in a simultaneous operation. The same holds true for the formation of caps 22 and 28, 28′. In many instances, two or more storage batteries may be treated in a simultaneous operation in an automatic machine which comprises a large number of molds 6, 8, 18 and 21 and wherein the application and removal of molds as well as insertion of cell connectors 4 and terminal posts 15 and pouring of lead and thermoplastic material may take place in a fully automatic way. The molds are mounted on suitable carriers which move such molds in parallel paths and at predetermined intervals.

The internal and external surfaces of the ribs 5 and 17 guide and locate molds 6, 8 and 18, 21 during movement toward the upper side of the cover 1 and such surfaces also insure that the molds invariably assume optimum positions for admission of molten metallic or insulating material. The rib 5 could be replaced by two recesses one of which would receive the edge portion 6b of the neck 6a and the other of which would receive the edge portion 9 of the rib 8a. The same applies for the rib 17.

The material of the cover 1 is at least slightly elastic so that the ribs 5 and 17 need not be formed with utmost precision because the cover will undergo some deformation in response to forcible application of the molds 6, 8, 18 and 21. If two or more molds are applied in a simultaneous operation, it is advisable to provide resilient elements between the individual molds so that the molds will have some freedom of lateral movement with reference to each other.

The cover 1 and housing 1a preferably consist of polystyrol, polyethylene or polypropylene. The thermoplastic material which is poured into the molds 8 and 21 is preferably identical with that of the cover 1 and housing 1a.

Without further analysis, the foregoing will so fully reveal the gist of the present invention that others can, by applying current knowledge, readily adapt it for various applications without omitting features which fairly constitute essential characteristics of the generic and specific aspects of my contribution to the art, and, therefore, such adaptations should and are intended to be comprehended within the meaning and range of equivalence of the following claims.

What is claimed as new and desired to be secured by Letters Patent is:

1. A method of insulating the cell connector of a multi-cell storage battery whose cover consists of weldable thermoplastic material and is provided with openings for the terminals of two adjoining cells, comprising forming the upper side of the cover with two locating surfaces one of which surrounds the other thereof and the other of which surrounds said openings; placing an apertured cell connector onto the upper side of the cover so that its apertures receive the terminals and that the cell connector is located within said other surface; placing a first mold against said other surface and pouring into said mold a molten metal at such temperature that the metal is fused with the cell connector and with said terminals; allowing the resulting bridge to harden and removing the first mold; placing a second mold against said one surface and introducing into said second mold a molten thermoplastic material at such temperature and in such quantities that the material is fused with the cover and forms an insulating cap around said bridge; and removing the second mold when the material of said cap hardens.

2. A method of insulating a prefabricated cell connector in a multi-cell storage battery whose cover consists of weldable thermoplastic material and is provided with openings for the terminals of two adjoining cells, comprising the steps of forming the outer side of the cover with an annular projection which surrounds said openings with at least some clearance; placing an apertured prefabricated cell connector against the outer side of the cover so that its apertures receive portions of said terminals and that the cell connector is located within the confines of and is spaced from the internal surface of said projection; placing a first mold against the outer side of the cover and in abutment with the internal surface of said projection; pouring into said mold molten lead at such temperature that molten lead fuses the cell connector with said terminals and forms therewith a one-piece bridge; removing the mold when the material of said bridge hardens; placing a second mold in sealing engagement with the outer side of said cover and in abutment with the external surface of said projection so that the projection is located within the confines of the second mold; pouring into said second mold a molten thermoplastic material at such temperature and in such quantities that the thermoplastic material is fused with the cover and with said projection to form therewith a smooth-surfaced insulating cap which conceals said bridge; and removing the second mold when the material of said cap hardens.

3. A method as set forth in claim 2, wherein said projection is a rib of other than circular outline.

4. A method of insulating the post strap of an end cell in a multi-cell storage battery whose cover consists of thermoplastic material and is provided with an opening for the post strap, comprising forming the upper side of the cover with two locating surfaces one of which surrounds the other thereof and the other of which surrounds said opening; placing an apertured terminal post onto the upper side of the cover so that its aperture receives the post strap and that the terminal post is surrounded by said other surface; placing a first mold against said other surface and pouring into said mold a molten metal at such temperature that the metal is fused with the post strap and with a portion of said terminal post; allowing the resulting bridge to harden and removing the first mold; placing a second mold against said one surface and introducing into said second mold a molten thermoplastic material at such temperature and in such quantities that the material is fused with the cover and forms an insulating cap around the lower portion of said terminal post; and removing the second mold when the material of said cap hardens.

5. A method of insulating the post strap of an end cell in a multi-cell storage battery whose cover consists of weldable thermoplastic material and is provided with an opening for the post strap, comprising the steps of forming the outer side of the cover with an annular projection which surrounds said opening with at least some clearance; placing a prefabricated apertured terminal post onto the outer side of said cover so that a portion of the post strap extends into the aperture of the terminal post; placing a first mold against the outer side of the cover and in abutment with the internal surface of said projection; pouring into said mold a supply of molten lead at such temperature that said lead fuses said terminal post with said post strap and forms therewith a one-piece bridge; removing said mold when the material of said bridge hardens; placing a second mold against the outer side of said cover and in abutment with the external surface of said projection; pouring into said second mold molten thermoplastic material at such temperature and in such quantities that said molten material fuses with said cover and with said projection to form an insulating cap around the major part of said bridge; and removing the second mold when the material of said cap hardens.

6. A method as set forth in claim 5, further comprising the steps of inserting an elastically deformable gasket around said terminal post and thereupon compressing the gasket during pouring of said molten thermoplastic material so that the thus deformed gasket is embedded in the material of said cap.

7. A method as set forth in claim 5, wherein said projection is a rib of other than circular outline.

8. A method of insulating the cell connectors and the post straps of a multi-cell storage battery whose cover consists of weldable synthetic plastic material and is provided with at least one pair of openings for the terminals of adjoining cells and with two additional openings for the post straps of end cells, comprising the steps of forming the upper side of the cover with pairs of locating surfaces for said pair of openings and for each additional opening whereby one surface of each pair of surfaces surrounds the other surface and the other surface of each pair of surfaces respectively surrounds said pair of openings and one of said additional openings; placing an apertured cell connector onto the upper side of the cover so that its apertures receive said terminals and that the cell connector is located within the other surface of the corresponding pair of surfaces; placing two apertured terminal posts onto the upper side of said cover so that the aperture of each terminal post receives one of said post straps; placing onto the upper side of said cover a first set of molds each of which registers with one of said other surfaces; pouring into said molds a molten metal at such temperature that the metal is fused with the cell connector and with said terminals to form therewith a first metallic bridge and that the metal is also fused with said post straps and with portions of the corresponding terminal posts to form a pair of second bridges; removing the molds when the material of said bridges hardens and placing onto the upper side of said cover a second set of molds each of which abuts against said one surface of the respective pair of surfaces; pouring into each mold of said second set a liquid thermoplastic material at such temperature and in such quantities that said material is fused with the material of said cover and forms a cap around each of said bridges; and removing the second set of molds when the material of said caps hardens.

9. A method as set forth in claim 8, wherein said cover is formed with pairs of endless annular surfaces of other than circular outline.

10. A method as set forth in claim 9, wherein said cover is formed with annular projections extending from said upper side thereof and wherein said pairs of locating surfaces respectively constitute the internal and external surfaces of the corresponding projections.

11. A method as set forth in claim 10, wherein each of said projections is formed with an edge portion tapering in a direction away from the upper side of said cover.

12. A method as set forth in claim 8, further comprising the steps of sealingly pressing the molds against the upper side of said cover during introduction of said molten materials.

13. A method as set forth in claim 8, further comprising the steps of placing an elastically deformable gasket around a portion of each terminal post and compressing each gasket by the corresponding molds of said second set so that the gaskets remain compressed during pouring of said molten thermoplastic material and remain embedded in the resulting caps.

14. A method as set forth in claim 8, wherein said molten metal is lead and wherein said molten thermoplastic material is readily weldable with the material of said cover.

15. A method as set forth in claim 8, further comprising the steps of simultaneously providing bridges and insulating caps on the cover of at least one additional multi-cell storage battery.

16. A method as set forth in claim 8, wherein said molds have neck portions which abut against the respective locating surfaces and wherein said neck portions taper in a direction toward the upper side of said cover.

References Cited

UNITED STATES PATENTS

| | | | |
|---|---|---|---|
| 389,676 | 9/1888 | Trippe | 136—170 XR |
| 1,313,513 | 8/1919 | Bedell | 136—170 XR |
| 1,732,158 | 10/1929 | Ford | 136—170.3 |
| 2,194,885 | 3/1940 | Critchfield et al. | 136—134 |

FOREIGN PATENTS 1,328,722  4/1963  France.

WINSTON A. DOUGLAS, *Primary Examiner.*

D. L. WALTON, *Assistant Examiner.*